United States Patent

Kubo et al.

Patent Number: 5,748,502
Date of Patent: May 5, 1998

[54] APPARATUS FOR MEASURING A FIGURE HAVING A CALIBRATION MODE AND METHOD FOR CALIBRATING A MEASURING APPARATUS

[75] Inventors: Akio Kubo; Hiroshi Nemoto, both of Tokyo, Japan

[73] Assignee: Ushikata Mfg. Co., Ltd., Tokyo, Japan

[21] Appl. No.: 522,587

[22] Filed: Sep. 1, 1995

[51] Int. Cl.⁶ ............................................. G01B 7/008
[52] U.S. Cl. .................. 364/560; 364/563; 364/571.01; 364/571.02; 178/18; 178/19
[58] Field of Search .................. 178/18, 19; 33/16, 33/1 M, 1 MP, 1 CC, 1 PT, 18.1, 121–124, 772, 775, 546, 503–505, 501.03, 501.04, 501.07, 501.09, 501.6, 501.8, 501.9; 73/1 R, 1 J, 866.5, 865.8; 364/560, 563, 571.1, 571.02, 571.05, 474.03, 474.18, 474.28, 474.29, 474.35, 474.37

[56] References Cited

U.S. PATENT DOCUMENTS

| | | | |
|---|---|---|---|
| 4,616,419 | 10/1986 | Kubo | 33/122 |
| 4,617,740 | 10/1986 | Mikio | 33/122 |
| 4,819,195 | 4/1989 | Bell et al. | 364/560 |
| 4,982,504 | 1/1991 | Söderberg et al. | 33/505 |
| 4,999,555 | 3/1991 | Yamazaki et al. | 364/474.37 |
| 5,115,569 | 5/1992 | Kubo | 33/1 M |
| 5,471,226 | 11/1995 | Suzuki et al. | 178/18 |

FOREIGN PATENT DOCUMENTS

| | | |
|---|---|---|
| 55-37682 | 9/1980 | Japan . |
| 62-119407 | 5/1987 | Japan . |
| 531721 | 5/1993 | Japan . |

*Primary Examiner*—Emanuel T. Voeltz
*Assistant Examiner*—Hal D. Wachsman
*Attorney, Agent, or Firm*—Greenblum & Bernstein, P.L.C.

[57] ABSTRACT

An apparatus for measuring a dimension or aspect of a figure, such as a linear planimeter or a polar planimeter, for measuring a size and shape of a figure and having a calibration mode. The apparatus includes a carriage supported on a pair of rollers for movement along an axis. One end of a measuring lever is pivotally mounted to the carriage. A tracing member having a magnifying lens for tracing a figure is provided on the other of the measuring lever. A computer having a calibrating mode changing switch and a correction value recording switch are provided on the carriage. To calibrate the apparatus, the apparatus is switched into the calibrating mode by the calibrating mode changing switch and correction values are calculated based on a reference figure. Each correction value is stored in a nonvolatile memory of the computer.

16 Claims, 6 Drawing Sheets

APPARATUS FOR MEASURING A FIGURE HAVING A CALIBRATION MODE AND METHOD FOR CALIBRATING A MEASURING APPARATUS

BACKGROUND OF THE INVENTION

1. Field of the Invention

The present invention relates to an apparatus for measuring the size, shape, or other dimension related parameter of a figure. More particularly, the present invention relates to a apparatus having self-calibrating mode for measuring the size and/or shape of a figure, which apparatus includes a linear planimeter or a polar planimeter.

2. Background and Material Information

Prior art measuring apparatus which measure a dimension of a figure with a computer are disclosed, e.g., in Japanese Patent Publication No. 55-37682, Japanese Patent Application No. 60-260814, and Japanese Patent Publication No. 5-31721. The apparatus disclosed in the above applications, which were filed by the Applicant of the present application, contains structural features related to the structure of the preferred embodiment of the present invention shown in FIGS. 1 and 2.

Figure 1:
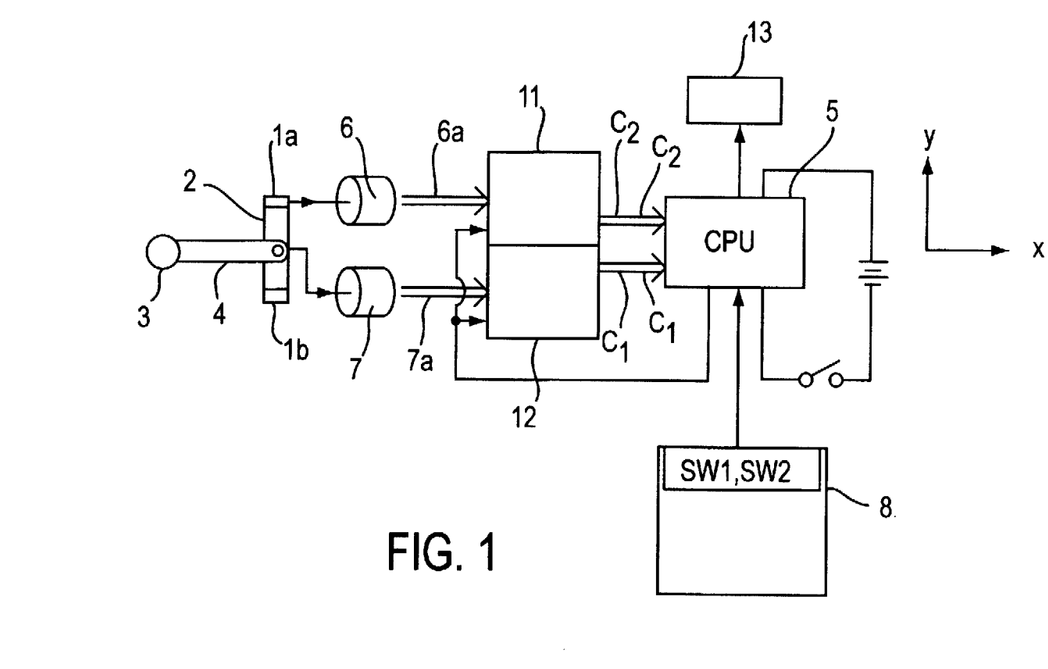
FIG. 1 is a schematic block diagram of a measuring apparatus according to the preferred embodiment of the present invention.

Referring to FIG. 1, a carriage 2 is rotatably supported by a pair of rollers 1a and 1b; rollers 1a and 1b have sufficient width to move the carriage along a direction (for ease of reference, this direction is referenced as the x-axis) in a horizontal plane. A measuring lever 4 is pivotally mounted to carriage 2 via a vertical shaft. A tracing member 3 is mounted on the other end of measuring lever 4.

A roller encoder 6, mounted in proximity to roller 1a, detects the position of the carriage 2 along the x-axis based on the rotational displacement of rollers 1a and 1b, and outputs a corresponding count value $C_2$. Similarly, a measuring lever encoder 7, mounted in proximity to the pivotally attachment of measuring lever 4 to carriage 2, monitors (i.e. detects) a rotational displacement of measuring lever 4 and outputs a corresponding count value $C_1$.

Based on count value $C_2$ from roller encoder 6, count value $C_1$ of measuring lever encoder 7, and a length L of measuring lever 4, a computer 5, mounted on carriage 2, calculates an area, length and angle of a figure.

A drawback of the above prior art measuring apparatus is that over time, usage and movement of the mechanical components of the device will result in wear and tear, which will result in play between the components, which in turn causes errors in the count values $C_1$ and $C_2$ of measuring lever encoder 7 and roller encoder 6, respectively. These errors in turn result in erroneous final values calculated by the apparatus.

In order to overcome the above drawback, the prior art apparatus can be periodically calibrated mechanically to minimize the above noted errors. Unfortunately, the calibration process is complicated, and errors will invariably appear between calibrations.

OBJECTS AND SUMMARY OF THE INVENTION

It is accordingly an object of the present invention to overcome the drawbacks of the prior art.

It is a further object of the present invention to provide an apparatus for measuring dimension related parameters of a figure in which the apparatus can be routinely periodically and easily calibrated electrically to eliminate or minimize any errors in calculated values.

According to a preferred embodiment of the invention, there is provided an apparatus for measuring a figure, comprising a carriage mounted on a pair of wheels for movement along a predetermined direction in a plane. A measuring lever has a first end rotatably mounted to the carriage. A tracing mechanism, mounted on a second end of the measuring lever, is provided for tracing a figure to be measured. A computer calculates a value related to the figure using at least a plurality of present correction values of the apparatus, and the computer also calculating a plurality of new correction values. A non-volatile memory stores the plurality of present correction values. A calibrating mode switch, provided on the apparatus, for changing a mode of the apparatus between an operational mode and a calibrating mode. A correction value replacing mechanism, provided on the apparatus, is for replacing the plurality of present correction values in the non-volatile memory with the plurality of new correction values calculated by the computer.

According to a feature of the preferred embodiment, there is provided a wheel rotation detecting mechanism for detecting a rotational angle of the pair of wheels. A measuring lever rotation detecting means for detecting a rotation angle of said measuring lever. The computer calculates the plurality of new correction values from a resolution of the wheel rotation detecting mechanism, the measuring lever rotation detecting mechanism, and a length of said measuring lever.

According to a further feature of the preferred embodiment, the computer calculates the plurality of new correction values from positions of a plurality of points of a reference figure which are measured by tracing the plurality of points by the tracing member.

According to a still further feature of the preferred embodiment, the reference figure is provided on a calibrating sheet, and the computer converts coordinates of the positions of the plurality of points of the reference figure in a coordinate system of the apparatus, to coordinates of the positions in the coordinate system of the calibrating sheet.

According to an other embodiment of the present invention, there is provided an apparatus for measuring an aspect of figure, comprising a movable carriage. A measuring lever is mounted rotatably on the carriage. A tracing member, mounted on the measuring lever, traces the figure. A memory stores a plurality of correction values. A reading mechanism reads a plurality of present correction values from the memory. A computer calculates the aspect of the figure based at least on a length of the measuring lever, a displacement of the movable carriage and the measuring lever, and the plurality of present correction values read out by the reading mechanism. A calibrating means for calibrating the apparatus, comprises a mechanism for tracing a reference figure with the tracing member; a mechanism for determining a plurality of new correction values from predetermined points of the reference figure; and a mechanism for replacing the plurality of present correction values with the plurality of new correction values when a difference between corresponding ones of the plurality of present correction values and the plurality of new correction values is greater than a predetermined allowable difference.

According to feature of this embodiment, the carriage is mounted on a plurality of rollers. A roller encoder outputs a first signal corresponding to a rotation angle of the rollers and a displacement of the carriage. A measuring lever encoder outputs a second signal corresponding a rotation angle of the measuring lever and displacement of the measuring lever. The computer calculates the aspect based on, at least, the first and second signals.

According to further feature of this embodiment, the plurality of present correction values and the plurality of new correction values include corrected resolutions of the roller encoder, the measuring lever encoder, and a length of the measuring lever.

According to a still further feature of this embodiment, x and y coordinates of a figure traced by the apparatus are defined by the following equations:

$$x = C_2 \cdot (R_s + \Delta R_s) - (L + \Delta L) \cdot [1 - \cos\{(C_1 + \Delta C_1) \cdot A_s\}]$$

$$y = (L + \Delta L) \cdot \sin\{(C_1 + \Delta C_1) \cdot A_s\}.$$

wherein: $C_1$ is a pulse count of the measuring lever encoder, $C_2$ is a pulse count of the roller encoder, L is a standard length of the measuring lever, $A_s$ is resolution of the measuring lever encoder, $R_s$ is the reference resolution of the roller encoder, $\Delta L$ is a correction value of the measuring lever, $\Delta C_1$ is a corrected pulse count of the measuring lever encoder, and $\Delta R_s$ is a corrected resolution of the roller encoder.

According to a still further feature of this embodiment, the X and Y coordinates for the reference figure components are defined by the following equations:

$$X = \frac{(a-x_o)(x-x_o) + (b-y_o)(y-y_o)}{[(a-x_o)^2 + (b-y_o)^2]^{1/2}}$$

$$Y = \frac{(a-x_o)(y-y_o) - (b-y_o)(x-x_o)}{[(a-x_o)^2 + (b-y_o)^2]^{1/2}}$$

wherein: $(x_0, y_0)$ represents a position of an origin of a calibrating coordinate system in terms of a mechanical coordinate system, (a, b) represents a position of a point on +X coordinate axis of the calibrating coordinate system in terms of the mechanical coordinate system, (x, y) represents a position of an arbitrary point in terms of the mechanical coordinate system, and (X, Y) represents a position of arbitrary point in terms of the calibrating coordinate system.

According to a still further feature of this embodiment, the corrected resolution of the roller encoder is given by the following equation:

$$\Delta R_s' = \frac{D_1}{X_2} (R_s + \Delta R_s) - R_s$$

wherein: $D_1$ is a distance between first and second predetermined points on the reference figure, $X_2$ is coordinate X value of the second point in the calibrating coordinate system, $R_s$ is a reference resolution of the roller encoder, $\Delta R_s$ is a present correction value of resolution of the roller encoder, and $\Delta R_s'$ is a new correction value of resolution of the roller encoder.

According to a still further feature of the invention, the corrected resolution of the length of the measuring lever is given by the following equation:

$$\Delta L' = \frac{D_2}{Y_3} (L + \Delta L) - L$$

wherein: $D_2$ is a distance between second and third predetermined points on the reference figure, $Y_3$ is coordinate value Y of the third point in the calibrating coordinate system, L is a reference length of the measuring lever, $\Delta L$ is a present correction value of the length of the measuring lever, and $\Delta L'$ is a new correction value of the length of the measuring lever.

According to a still further feature of this embodiment, the reference figure is a rectangle.

According to a still further feature of this embodiment, the corrected resolution of the measuring lever encoder is given by the following equation:

$$\Delta C_1' = \frac{\sin^{-1}[(X_3 - X_2)/D_2]}{A_s} + \Delta C_1$$

wherein: $D_2$ is a distance between second and third predetermined points on the reference figure, $X_3$ is coordinate value X of the third point in a calibrating coordinate system, $X_2$ is coordinate value X of the second point in the calibrating coordinate system, $A_s$ is a resolution of the measuring lever encoder, $\Delta C_1$ is the present correction value of a pulse count of the measuring lever encoder, and $\Delta C_1'$ is a new correction value of a pulse count of the measuring lever encoder.

According to another embodiment of the invention, there is provided a method for calibrating a measuring apparatus, the measuring apparatus including a movable carriage, a measuring lever mounted rotatably on the carriage, a tracing member, mounted on a free end of the measuring lever, for tracing the figure, a roller encoder for detecting displacement of the carriage, a measuring lever encoder for detecting displacement of the measuring lever, and a memory for storing present correction values related to a length of the measuring lever, displacement of the carriage and displacement of the measuring lever. The calibration method comprises the steps of moving the tracing member to a plurality of points on a reference figure provided on a calibration sheet; calculating new correction values at least based upon coordinates of the plurality of points and the present correction values; determining whether a difference between a present correction value and corresponding one of the new correction values exceeds a corresponding predetermined allowable range; replacing the present correction value with the new correction values if the difference is greater than the corresponding predetermined allowable range; and repeating the steps of determining and replacing for each present correction value.

According to a feature of this embodiment, there is provided a step of ending the repeating step after a predetermined number of repetitions.

The above, and other objects, features and advantages of the present invention will become apparent from the following description read in conjunction with the accompanying drawings, in which like reference numerals designate the same elements.

DETAILED DESCRIPTION OF THE INVENTION

Figure 2:
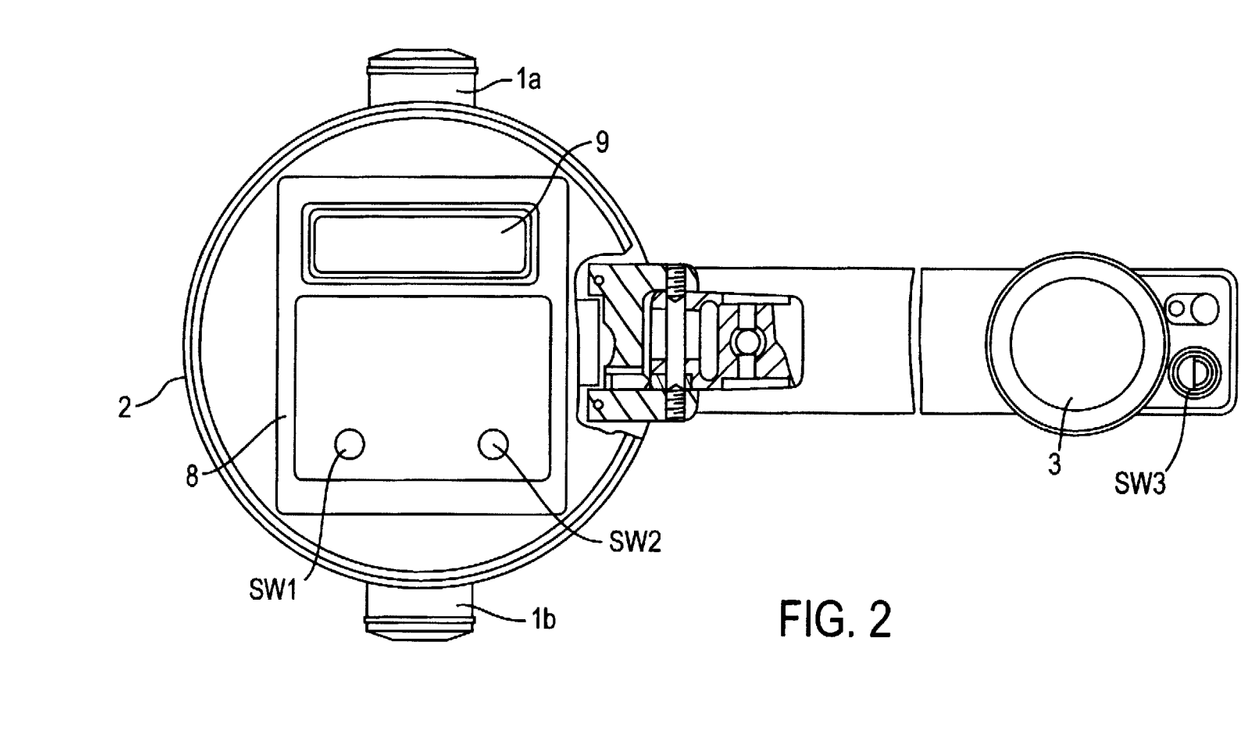
FIG. 2 is a front view of a measuring apparatus according to the preferred embodiments of the present invention.

Referring now to FIGS. 1 and 2, the preferred embodiment will be described below. To the extent that the body of the device shares common elements with the prior art discussed above, descriptions of like elements are minimized in respect of brevity.

A carriage 2 is mounted on a pair of rollers 1a and 1b. Rollers 1a and 1b are of sufficient width to move carriage 2 along the x axis. A first end of a measuring lever 4 is rotatably mounted to carriage 2 via a vertical shaft. A tracing member 3, which has a magnifying lens to trace along the contour of a figure to be measured, is attached to the remaining free end of measuring lever 4. A count fetching switch SW3 is provided on tracing member 3.

A computer 5 is mounted on carriage 2. Computer 5 has a keyboard 8 and a display 9 for input and display of information, respectively. A calibrating mode change switch SW1 and a correction value storing (or writing) switch SW2 (to be described in greater detail below) are mounted on keyboard 8.

A roller encoder 6 monitors the angular rotational displacement of rollers 1a and 1b, and generates a corresponding signal 6a. Similarly, a measuring lever encoder 7 monitors the angular rotational displacement of measuring lever 4, and generates a corresponding signal 7a.

The structural components described above operate as follows. As tracing member 3 moves to trace the contours of a figure, rollers 1a and 1b and measuring lever 4 move accordingly. Encoders 6 and 7 monitor these movements and generate signals 6a and 7a, which are counted by counters 11 and 12. When counter fetching switch SW3 is depressed, the output of counters 11 and 12 transfer to a computer 5 in the form of signals $C_2$ and $C_1$. Computer 5 then calculates the size and shape of the figure, including length, area, and angles in the figure, to be measured according to an algorithm input from a keyboard 8, based on signals $C_2$ and $C_1$. The calculated values are then displayed on a display device 9.

As the present invention is used over time, it becomes necessary to calibrate the various sensors (or encoders) to prevent errors in the final calculations. Calibration must therefore be preformed on three components.

Calibration to compensate for changes relating to the outer diameter of rollers 1a and 1b are preformed by adjusting the resolving power of roller encoder 6. In other words, the resolution of movement along the x direction is adjusted to compensate for changes in the diameters of rollers 1a and 1b due to wear or erosion.

Calibration to compensate for changes relating to the length L of measuring lever 4 are preformed by adjusting the resolving power of length along the y direction. This calibration accounts for play in the bearings connecting measuring lever 4 to carriage 2, or errors due to aging of measuring lever 4.

Calibration for a reset angle of measuring lever 4 is preformed by adjusting the count value output from measuring lever encoder 7, i.e., by correcting inclination of the y axis. This calibration accounts for deviation in the return position (i.e., reset angle) of the measuring lever 4.

Figure 6:
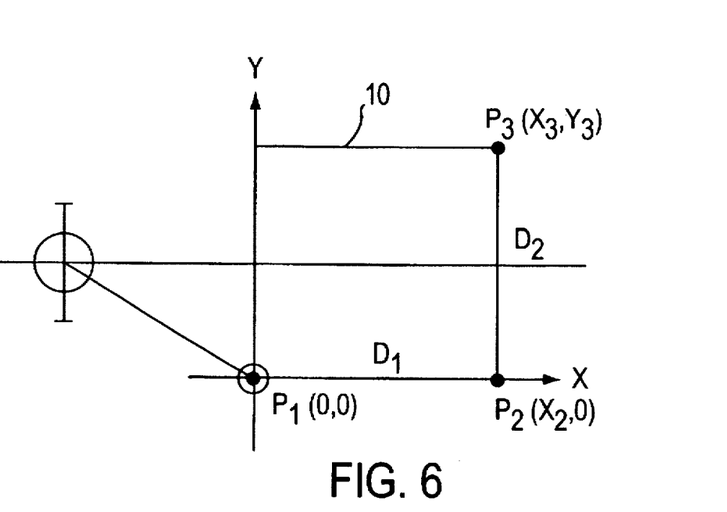
FIG. 6 is a top view of a reference figure used for calibrating the apparatus of the present invention.

Referring now to FIG. 6, these corrections are executed by depressing calibrating mode changing switch SW1. Tracing member 3 then traces points $P_1$ (0, 0), $P_2$ ($X_2$, 0), and $P_3$ ($X_3$, $Y_3$) on a reference FIG. 10, provided (i.e., drawn) on a calibration sheet. As discussed in greater detail below, since distances between these points are known, the present invention can compare the measured distances with the know distances to detect errors and compensate for same.

Corrected values of the outer diameter of rollers 1a and 1b, length L, and the reset angle are calculated, displayed on display device 9, and stored into a non-volatile memory 13 by depression of a correction value writing switch SW2. These correction values are read from a nonvolatile memory 13 are used utilized in future calculations. For future calibrations, these correction values are used to calculate new correction values according to an algorithm stored in computer 5. Calculation of the correction values for calibration is explained below.

For the ease of reference, positions in a mechanical coordinate system (MCS) of the present invention is represented by (x, y), while positions in a calibrating coordinate system (CCS) of the calibrating sheet is represented by (X, Y). The MCS is inherently determined by the physical structure of apparatus, in which the direction of movement of carriage 2 is along the x axis; the origin of the MCS is an arbitrary point through which the apparatus can trace without rotation of measuring lever 4. Similarly, the CCS is a ordinate system of the calibrating sheet on which reference FIG. 10 is drawn or otherwise provided. Point P on the calibrating sheet is the origin (0, 0) of the system, and point P2 on the calibrating sheet is on the +X axis.

A. Equation for calculating mechanical coordinates

The relation between the output variables from the encoders 6 and 7 and coordinates (x, y) are expressed by the following equation $$x = C_2 \cdot (R_s + \Delta R_s) - (L + \Delta L) \cdot [1 - \cos\{(C_1 \Delta C_1) \cdot A_s\}] \quad (1)$$

$$y = (L + \Delta L) \cdot \sin\{(C_1 + \Delta C_1) \cdot A_s\}$$

wherein:

$C_1$ is a pulse count of measuring lever encoder 7, $C_2$ is a pulse count of roller encoder 6, L (distance in mm) is a standard (i.e., nominal) length of measuring lever 4, $A_s$ (angle) is resolution of the measuring lever encoder 7, i.e., $A_s = 360$ degrees/(count of measuring lever encoder 7 per one rotation of measuring lever 4), $R_s$ (distance in mm) is the reference resolution of roller encoder 6, i.e., $R_s = $(outer diameter of rollers 1a/1b)·π/(count of roller encoder 7 per one rotation of roller 1a/1b), $\Delta L$ (distance in mm) is a correction value of measuring lever 4, $\Delta C_1$ is a corrected pulse count of measuring lever encoder 7, and $\Delta R_s$ (mm) is a corrected resolution of roller encoder 6.

B. Equations for obtaining calibrating coordinates (X, Y) of the calibrating coordinate system from coordinates (x, y) of the mechanical coordinate system.

Figure 7:
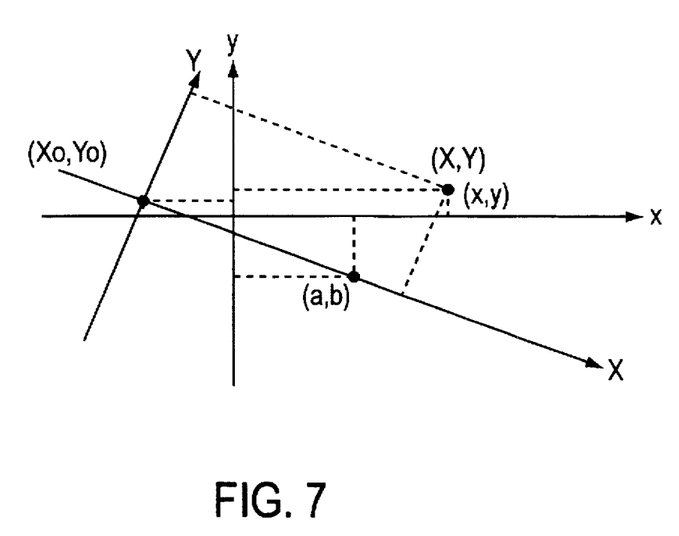
FIG. 7 is a top view indicating a relation between a coordinate system of the apparatus of the preferred embodiment of the present invention and a coordinate system of a reference figure.

To obtain calibrating coordinates (X, Y) of the reference FIG. 10 from the MCS coordinates (x, y), the origin ($x_0$, $y_0$) of the calibrating coordinates and a point (a, b) on the positive X coordinate axis of the calibrating coordinate system, as shown in FIG. 7, are used.

$$X = \frac{(a-x_o)(x-x_o)+(b-y_o)(y-y_o)}{[(a-x_o)^2+(b-y_o)^2]^{1/2}} \quad (2)$$

$$Y = \frac{(a-x_o)(y-y_o)-(b-y_o)(x-x_o)}{[(a-x_o)^2+(b-y_o)^2]^{1/2}}$$

wherein:

$(x_0, y_0)$ represents the position of the origin of the calibrating coordinate system in terms of the mechanical coordinate system, (a, b) represents a position of a point on +X coordinate axis of the calibrating coordinate system in terms of the mechanical coordinate system.

(x, y) represents a position of an arbitrary point in terms of the mechanical coordinate system, and (X, Y) represents a position of arbitrary point in terms of the calibrating coordinate system.

C. Method for calculating new correction values

To calculate new correction values, the positions of points $P_1$, $P_2$ and $P_3$ of reference FIG. 10 are drawn on the calibrating sheet with an area of $D_1 \cdot D_2$ where $D_1$, is a distance between $P_1$ and $P_2$ and $D_2$ is a distance between $P_2$ and $P_3$; the apparatus traces points $P_1$, $P_2$ and $P_3$ in that order. The apparatus is initially disposed substantially in the center of the calibrating sheet, as shown in FIG. 6, so that the x-axis of the mechanical coordinate system is substantially parallel to the X-axis of the calibrating sheet, and the x-axis passes through the approximate mid point of $P_2$ and $P_3$.

Next, coordinate values of points $P_1$, $P_2$ and $P_3$ measured above are derived from equations (1) and (2). New correction values are then calculated as follows.

1. Correction of Resolution of Roller Encoder 6

Instead of correcting the value of outer diameter of rollers 1a and 1b directly, the resolution of roller encoder 6 is indirectly corrected by the following equation:

$$\Delta R_s' = \frac{D_1}{X_2}(R_s + \Delta R_s) - R_s \quad (3)$$

wherein:

$D_1$ is a distance between points $P_1$ and $P_2$.

$X_2$ is coordinate X value of the point $P_2$ in the calibrating coordinate system, $R_s$ is a reference resolution of roller encoder 6, having a distance dimension, $\Delta R_s$ is the present correction value of resolution of roller encoder 6, which is used for calibration, and $\Delta R_s'$ is a new correction value of resolution of roller encoder 6.

2. Correction of Length of Measuring Lever 4

The correction value of the length of measuring lever 4 is calculated by the following equation:

$$\Delta L' = \frac{D_2}{Y_3}(L + \Delta L) - L \quad (4)$$

wherein:

$D_2$ is a distance between points $P_2$ and $P_3$, $Y_3$ is coordinate value Y of point $P_3$ in the calibrating coordinate system, L is the reference length of measuring lever, ΔL is a present correction value of the length of measuring lever 4, and ΔL' is a new correction value of the length of measuring lever 4.

3. Correction of Resolution of Measuring Lever Encoder 7

The correction value of the count of measuring lever encoder is then calculated, i.e., the reset angle of the measuring lever encoder 7 is corrected by the following equation:

$$\Delta C_1' = \frac{\sin^{-1}[(X_3 - X_2)/D_2]}{A_s} + \Delta C_1 \quad (5)$$

wherein:

$D_2$ is a distance between points $P_2$ and $P_3$, $X_3$ is coordinate value X of point $P_3$ in the calibrating coordinate system, $X_2$ is coordinate value X of point $P_2$ in the calibrating coordinate system, $A_s$ is the resolution of measuring lever encoder 7, which has an angle dimension, $\Delta C_1$ is the present correction value of a pulse count of measuring lever encoder 7, and $\Delta C_1'$ is a new correction value of a pulse count of measuring lever encoder 7.

Figure 3:
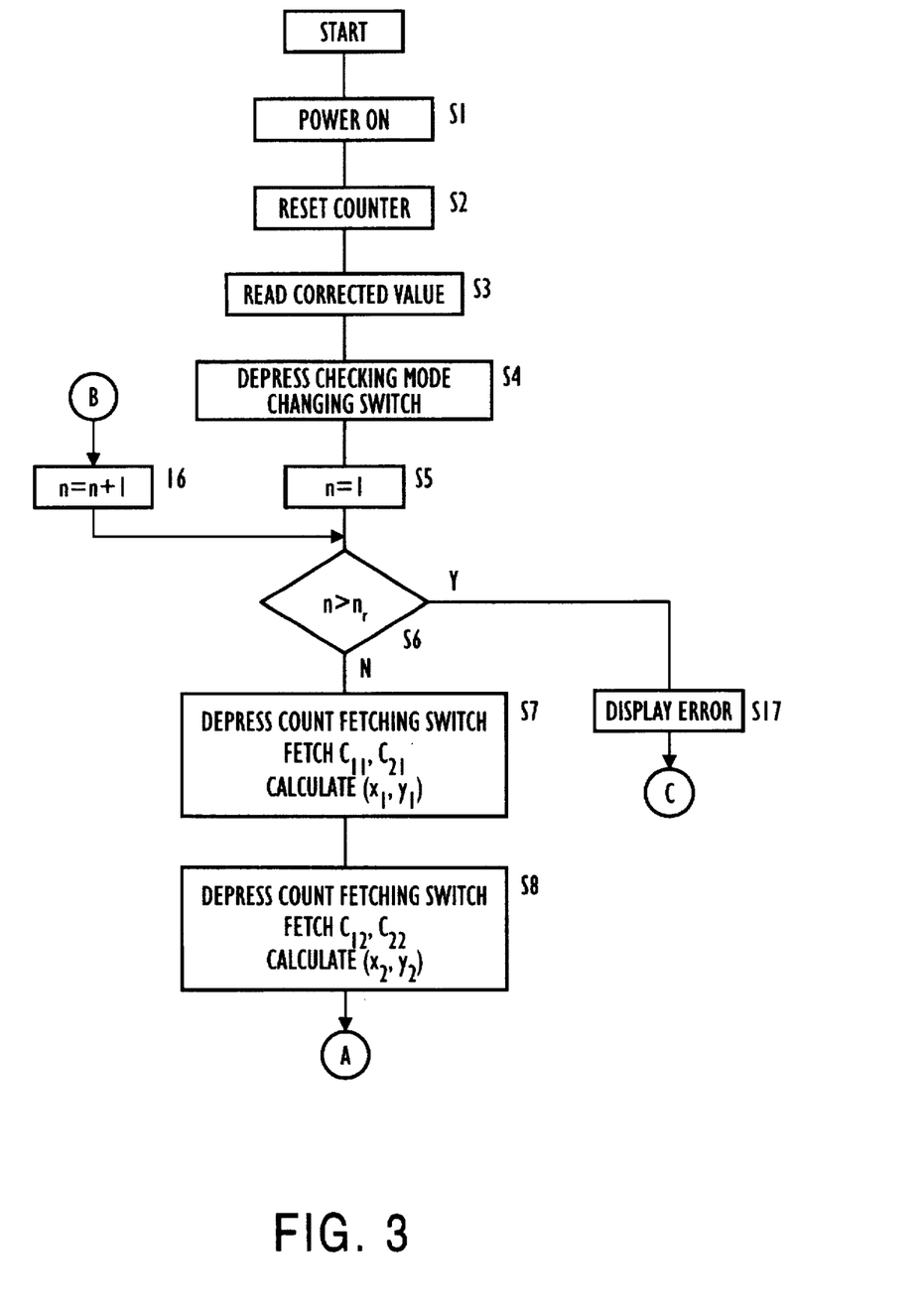
FIG. 3 is a flow chart showing the calibration process of the present invention.
Figure 4:
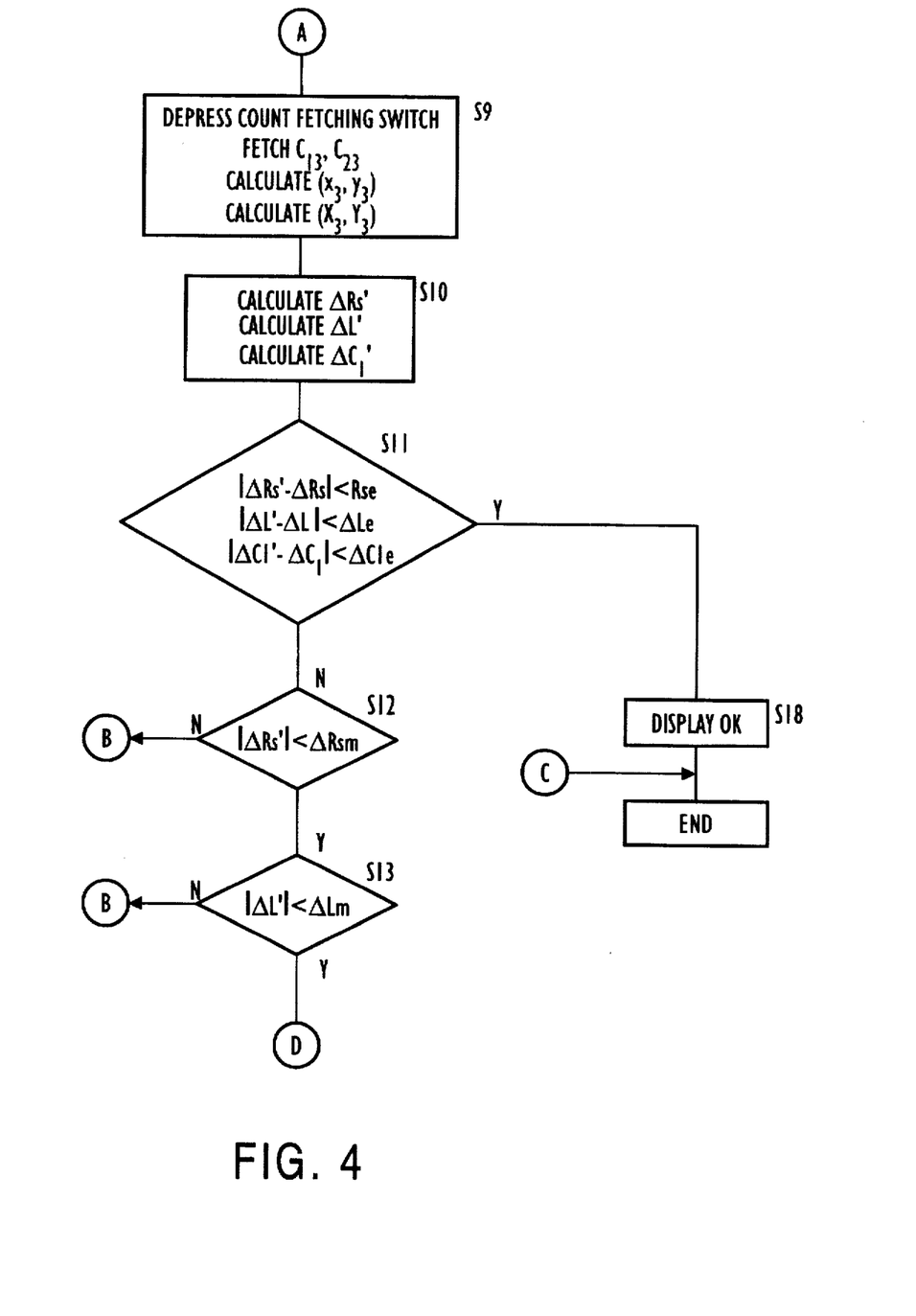
FIG. 4 is a flow chart showing the calibration process of the present invention, continued from FIG. 3.
Figure 5:
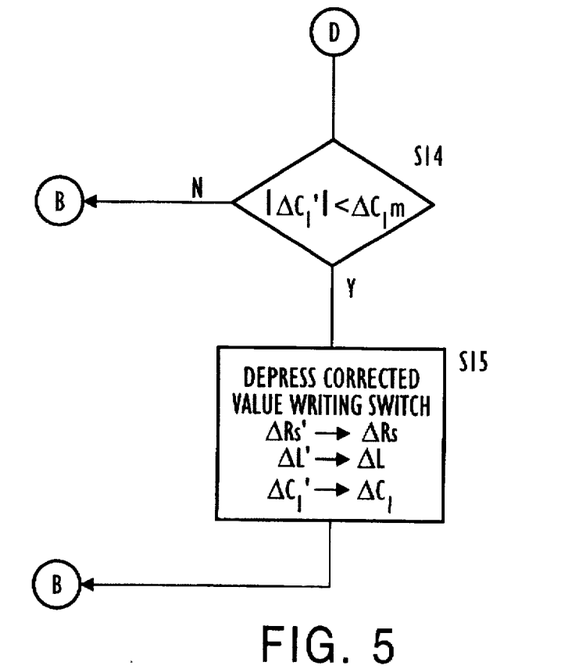
FIG. 5 is a flow chart showing the calibration process of the present invention, continued from FIG. 4.

Referring now to FIGS. 3–5, the operation of the present invention is described with reference to the flow charts of FIGS. 3–5 is explained below.

In step S1, the measuring apparatus is turned on.

In step S2, counters 11 and 12 of measuring lever encoder 7 and roller encoder 6 are reset.

In step S3, present correction values $\Delta R_s$, $\Delta L$, and $\Delta C_1$ are retrieved from nonvolatile memory 13, and provided to the CPU of computer 5. If these values have not been previously stored (i.e., first calibration is taking place) then a zero is retrieved for each value.

Calibration of the measuring apparatus is initiated at step S4 by depression of calibrating mode circuit change switch SW1. A variable n, which represents the number of times the apparatus has gone through the calibration sequence, is initialized at 1 (i.e., n=1) and stored in the CPU of computer 5 at step S5.

At step S6, the apparatus determines whether the number of times the apparatus has gone through the calibration sequence exceeds a previously set reference number $n_r$ (i.e., n>$n_r$). If so (i.e., n is greater than $n_r$), control passes to a step S17, wherein an error message and variable "n" is displayed on display 9. The significance of this step is discussed with respect to steps S12–S14.

If however, the number of calibration sequences is not greater than the predetermined number (i.e., n is less than or equal to $n_r$), then a marking or tracing point of tracing member 3 moves to point $P_1$ on the calibrating sheet. Count fetching (i.e. retrieving) switch SW3 is depressed, transferring count value $C_{11}$ (i.e., $C_1$ at $P_1$) of measuring lever encoder 7 and count value $C_{21}$ (i.e., $C_2$ at $P_1$) of roller encoder 6 to the CPU of computer 5. Mechanical coordinates $(x_1, y_1)$ are obtained from count values $C_{11}$ and $C_{21}$ from equation (1), and coordinates $(x_0, y_0)$ in equation (2) are set equal to the calculated coordinates $(x_1, y_1)$ to yield calibrated coordinates $(X_1, Y_1)$.

In step S8, the marking point of tracing member 3 moves to point $P_2$ on the calibrating sheet. Upon depression of count fetching switch SW3, count value $C_{12}$ (i.e., $C_1$ at $P_2$) of measuring lever encoder 7 and count value $C_{22}$ (i.e., $C_2$ at $P_2$) of roller encoder 6 transfer to the CPU of computer 5. Mechanical coordinates $(x_2, y_2)$ are obtained from count values $C_{12}$ and $C_{22}$ from equation (1), and coordinates (a, b) in equation (2) are set equal to the calculated coordinates $(x_2, y_2)$ to produce calibrated coordinates $(X_2, Y_2)$ ($Y_2$ should equal 0 if $P_2$ is on the X-axis).

In step S9, the mark point of tracing member 3 moves to point $P_3$ on the calibrating sheet. Upon depression of count fetching switch SW3, count value $C_{13}$ (i.e., $C_1$ at $P_3$) of measuring lever encoder 7 and count value $C_{23}$ (i.e., $C_2$ at $P_3$) of roller encoder 6 transfer to the CPU of computer 5. The mechanical coordinates ($x_3$, $y_3$) are obtained from count values $C_{13}$ and $C_{23}$ from equation (1), and calibrating coordinates ($X_3$, $Y_3$) are obtained from the mechanical coordinates ($x_3$, $y_3$) using equation (2).

In step S10, new correction values $\Delta R_s'$ (resolution of roller encoder 6), $\Delta L'$ (resolution of the length measuring lever 4), and $\Delta C_1'$ (count of the measuring lever encoder 7) are obtained from equations (3), (4) and (5), respectively.

Once the new correction values are calculated in step S10, the CPU determines, at step S11, whether the difference between the new values and the present correction values are within preset allowable differences:

$$|\Delta R_s' - \Delta R_s| < \Delta R_{se},$$

$$|\Delta L' - \Delta L| < \Delta L_e,$$

and $$|\Delta C_1' - \Delta C_1| < \Delta C_{1e}.$$

If all of the determined new correction values are within the corresponding preset allowable differences from the present correction values, then a "OK" is displayed on the display device 9, and the calibration sequence ends.

If, however, any of the values in step S11 are not within the corresponding preset allowable difference, then new calculated correction values $\Delta R_s'$, $\Delta L'$ and $\Delta C_1'$ are individually compared in steps S12 through S14 against maximum setting ranges $\Delta R_{sm}$, $\Delta L_m$ and $\Delta C_{1m}$, respectively. These steps are designed to detect gross errors which are uncommon during the calibration process.

If any of the individual calculated correction values are greater than any of maximum setting ranges, control passes from the corresponding steps S12–S14 to step S16, at which the variable n (representing the total number of calibration sequences) is incremented by 1 (i.e., n=n+1). Control then returns to S6, upon which the calibration sequence repeats.

If, however, all of the calculated correction values are within their corresponding maximum set ranges, control passes to S15, wherein the corrected value writing switch SW2 is depressed. As a result, new calculated correction values $\Delta R_s'$, $\Delta L'$ and $\Delta C_1'$ are written into memory as present calculated correction values $\Delta R_s$, $\Delta L$, and $\Delta C_1$, respectively. Control then passes to step S16 as described above.

As illustrated by the foregoing, the present invention calibrates the measuring device electrically, and a user need only depress the various switches (which can be prompted by messages on display 9) to implement the calibration process. Accordingly, mechanical adjustment and the time and expense incurred thereby, are unnecessary.

Further, since a nonvolatile memory 13 is utilized, a backup battery or dip switch system is unnecessary. As such, the calibration time for preforming is reduced. Additionally calibration over a wide range can be carried out.

Still further, if a template (i.e. reference figure) for calibrating the apparatus is provided for a user, the user can easily know the calibration accuracy of the apparatus.

The disclosures of Japanese Patent Publication No. 55-37682, Japanese Patent Application No. 60-260814, and Japanese Patent Publication No. 5-31721 are expressly incorporated herein in their entireties.

Having described the preferred embodiments of the invention with reference to the accompanying drawings, it is to be understood that the invention is not limited to those precise embodiments, and that various changes and modifications may be effected therein by one skilled in the art without departing from either the scope or spirit of the invention as defined in the appending claims.

What is claimed is:

1. An apparatus for measuring a figure, comprising:
   a carriage mounted on a pair of wheels for movement along a predetermined plane;
   a measuring lever having a first end rotatably mounted to said carriage;
   tracing means, mounted on a second end of said measuring lever, for tracing a figure to be measured;
   computer means for calculating a value related to the figure using at least a plurality of present correction values of said apparatus, said computer means including means for calculating a plurality of new correction values from positions of a plurality of points of a reference figure, provided on a calibrating sheet, which are measured by tracing said plurality of points by said tracing means;
   non-volatile memory means for storing said plurality of present correction values;
   calibrating mode switching means, provided on said apparatus, for changing a mode of said apparatus between an operational mode and a calibrating mode;
   correction value replacing means, provided on said apparatus, for replacing said plurality of present correction values in said non-volatile memory with said plurality of new correction values calculated by said computer means; and
   said computer means converting coordinates of said positions of said plurality of points of said reference figure in a coordinate system of said apparatus, to coordinates of said positions in said coordinate system of said calibrating sheet.

2. The apparatus for measuring a figure according to claim 1, further comprising:
   wheel rotation detecting means for detecting a rotational angle of said pair of wheels; and
   measuring lever rotation detecting means for detecting a rotation angle of said measuring lever,
   wherein said computer means calculates said plurality of new correction values from a resolution of said wheel rotation detecting means, said measuring lever rotation detecting means, and a length of said measuring lever.

3. An apparatus for measuring an aspect of figure, comprising:
   a movable carriage;
   a measuring lever mounted rotatably on said carriage;
   a tracing member, mounted on said measuring lever, for tracing the figure;
   a memory for storing a plurality of correction values;
   means for reading a plurality of present correction values from said memory;
   a computer, said computer calculating the aspect of the figure based at least on a length of said measuring lever, a displacement of said movable carriage and said measuring lever, and said plurality of present correction values read out by said reading means; and
   calibrating means for calibrating said apparatus, comprising:
     means for tracing a reference figure with said tracing member;
     means for determining a plurality of new correction values from predetermined points of said reference figure; and means for replacing said plurality of present correction values with said plurality of new correction values when a difference between corresponding ones of said plurality of present correction values and said plurality of new correction values is greater than a predetermined allowable difference.

4. The apparatus according to claim 3, further comprising:

said carriage being mounted on a plurality of rollers;

a roller encoder which outputs a first signal corresponding to a rotation angle of said rollers and a displacement of said carriage; and a measuring lever encoder which outputs a second signal corresponding a rotation angle of said measuring lever and displacement of said measuring lever;

wherein said computer calculates said aspect based on, at least, said first and second signals.

5. The apparatus according to claim 4, said plurality of present correction values and said plurality of new correction values include corrected resolutions of said roller encoder, said measuring lever encoder, and a length of said measuring lever.

6. The apparatus according to claim 5, wherein said corrected resolution of said roller encoder is given by the following equation:

$$\Delta R_s' = \frac{D_1}{X_2} (R_s + \Delta R_s) - R_s$$

wherein:

$D_1$ is a distance between first and second predetermined points on said reference figure, $X_2$ is coordinate X value of said second point in the calibrating coordinate system, $R_s$ is a reference resolution of said roller encoder, $\Delta R_s$ is a present correction value of resolution of said roller encoder, and $\Delta R_s'$ is a new correction value of resolution of said roller encoder.

7. The apparatus according to claim 6, wherein said corrected resolution of said measuring lever encoder is given by the following equation:

$$\Delta C_1' = \frac{\sin^{-1}((X_3 - X_2)/D_2)}{A_s} + \Delta C_1$$

wherein:

$D_2$ is a distance between second and third predetermined points on said reference figure, $X_3$ is coordinate value X of said third point in a calibrating coordinate system, $X_2$ is coordinate value X of said second point in the calibrating coordinate system, $A_s$ is a resolution of said measuring lever encoder, $\Delta C_1$ is the present correction value of a pulse count of said measuring lever encoder, and $\Delta C_1'$ is a new correction value of a pulse count of said measuring lever encoder.

8. The apparatus according to claim 5, wherein said corrected resolution of said length of said measuring lever is given by the following equation:

$$\Delta L' = \frac{D_2}{Y_3} (L + \Delta L) - L$$

wherein:

$D_2$ is a distance between second and third predetermined points on said reference figure, $Y_3$ is coordinate value Y of said third point in the calibrating coordinate system, L is a reference length of said measuring lever, $\Delta L$ is a present correction value of said length of said measuring lever, and $\Delta L'$ is a new correction value of said length of said measuring lever.

9. The apparatus according to claim 4, wherein x and y coordinates of a figure traced by said apparatus are defined by the following equations:

$$x = C_2 \cdot (R_s + \Delta R_s) - (L + \Delta L) \cdot (1 - \cos)\{(C_1 + \Delta C_1) \cdot A_s\})$$

$$y = (L + \Delta L) \cdot \sin \{(C_1 + \Delta C_1) \cdot A_s\}$$

wherein:

$C_1$ is a pulse count of said measuring lever encoder, $C_2$ is a pulse count of said roller encoder, L is a standard length of said measuring lever, $A_s$ is resolution of said measuring lever encoder, $R_s$ is the reference resolution of said roller encoder, $\Delta L$ is a correction value of said measuring lever, $\Delta C_1$ is a corrected pulse count of said measuring lever encoder, and $\Delta R_s$ is a corrected resolution of said roller encoder.

10. The apparatus of 9, wherein X and Y coordinates for said reference figure components are defined by the following equations:

$$X = \frac{(a - x_0)(x - x_0) + (b - y_0)(y - y_0)}{((a - x_0)^2 + (b - y_0)^2)^{1/2}}$$

$$Y = \frac{(a - x_0)(y - y_0) - (b - y_0)(x - x_0)}{((a - x_0)^2 + (b - y_0)^2)^{1/2}}$$

wherein:

$(x_0, y_0)$ represents a position of an origin of a calibrating coordinate system in terms of a mechanical coordinate system, (a, b) represents a position of a point on +X coordinate axis of the calibrating coordinate system in terms of the mechanical coordinate system, (x, y) represents a position of an arbitrary point in terms of the mechanical coordinate system, and (X, Y) represents a position of arbitrary point in terms of the calibrating coordinate system.

11. The apparatus according to claim 3, wherein said reference figure is a rectangle.

12. A method for calibrating a measuring apparatus, said measuring apparatus including a movable carriage, a measuring lever mounted rotatably on the carriage, a tracing member, mounted on a free end of said measuring lever, for tracing the figure, a roller encoder for detecting displacement of the carriage, a measuring lever encoder for detecting displacement of said measuring lever, and a memory for storing present correction values related to a length of the measuring lever, displacement of said carriage and displacement of said measuring lever, said calibration method comprising the steps of:
- moving said tracing member to a plurality of points on a reference figure provided on a calibration sheet;
- calculating new correction values at least based upon coordinates of the plurality of points and the present correction values;
- determining whether a difference between a present correction value and corresponding one of the new correction values exceeds a corresponding predetermined allowable range;
- replacing the present correction value with the new correction values if the difference is greater than the corresponding predetermined allowable range; and
- repeating the steps of determining and replacing for each present correction value.

13. The method of claim 12, further comprising a step of ending the repeating step after a predetermined number of repetitions.

14. The method of claim 12, wherein said step of calculating comprises:
- calculating coordinates of the plurality of points in a mechanical coordinate system according to the following equation:

$$x = C_2 \cdot (R_s + \Delta R_s) - (L + \Delta L) \cdot (1 - \cos\{(C_1 + \Delta C_1) \cdot A_s\})$$
$$y = (L + \Delta L) \cdot \sin\{(C_1 + \Delta C_1) \cdot A_s\}$$

- calculating coordinates of the plurality of positions on the reference figure in a calibration coordinate system according to the following equation:

$$X = \frac{(a - x_o)(x - x_o) + (b - y_o)(y - y_o)}{((a - x_o)^2 + (b - y_o)^2)^{1/2}}$$

$$Y = \frac{(a - x_o)(y - y_o) - (b - y_o)(x - x_o)}{((a - x_o)^2 + (b - y_o)^2)^{1/2}}$$

- calculating a new correction value for a resolution of the roller encoder according to the following equation:

$$\Delta R_s' = \frac{D_1}{X_2} (R_s + \Delta R_s) - R_s$$

- calculating a new correction value for a length of the measuring lever according to the following equation:

$$\Delta L' = \frac{D_2}{Y_3} (L + \Delta L) - L$$

- calculating a new correction value for a resolution of the measuring lever encoder according to the following equation:

$$\Delta C_1' = \frac{\sin^{-1}[(X_3 - X_2)/D_2]}{A_s} + \Delta C_1$$

wherein:
- $C_1$ is a pulse count of said measuring lever encoder;
- $C_2$ is a pulse count of said roller encoder;
- L is a standard length of said measuring lever;
- $A_s$ is resolution of said measuring lever encoder;
- $R_s$ is the reference resolution of said roller encoder;
- $\Delta L$ is a correction value of said measuring lever;
- $\Delta C_1$ is a corrected pulse count of said measuring lever encoder; and
- $\Delta R_s$ is a corrected resolution of said roller encoder;
- $(x_o, y_o)$ represents a position of an origin of the calibrating coordinate system in terms of the mechanical coordinate system;
- (a, b) represents a position of a point on +X coordinate axis of the calibrating coordinate system in terms of the mechanical coordinate system.
- (x, y) represents a position of an arbitrary point in terms of the mechanical coordinate system; and
- (X, Y) represents a position of arbitrary point in terms of the calibrating coordinate system;
- $D_1$ is a distance between first and second points on said reference figure;
- $X_2$ is a coordinate X value of said second point in the calibrating coordinate system;
- $\Delta R_s'$ is a new correction value of resolution of said roller encoder;
- $D_2$ is a distance between said second point and a third point on said reference figure;
- $Y_3$ is a coordinate value Y of said third point in the calibrating coordinate system;
- $\Delta L'$ is a new correction value of said length of said measuring lever;
- $X_3$ is a coordinate value X of said third point in the calibrating coordinate system; and
- $\Delta C_1'$ is a new correction value of a pulse count of said measuring lever encoder.

15. An apparatus for measuring a figure, comprising:
- a carriage mounted on a pair of wheels for movement along a predetermined plane;
- a measuring lever having a first end rotatable mounted to said carriage;
- tracing means, mounted on a second end of said measuring lever, for tracing a figure to be measured;
- computer means for calculating a value related to the figure using at least a plurality of present correction values of said apparatus, said computer means including means for calculating a plurality of new correction values;
- non-volatile memory means for storing said plurality of present correction values;
- calibrating mode switching means, provided on said apparatus for changing a mode of said apparatus between an operational mode and a calibrating mode; and
- correction value replacing means provided on said apparatus, for replacing said plurality of present correction values in said non-volatile memory with said plurality of new correction values calculated by said computer means; and
- said correction value replacing means only replacing said plurality of present correction values with said plurality of new correction values when a difference between corresponding ones of said plurality of present correction values and said plurality of new correction values is greater than a predetermined allowable difference.

16. The apparatus for measuring a figure according to claim 15, further comprising:
- wheel rotation detecting means for detecting a rotational angle of said pair of wheels; and measuring lever rotation detecting means for detecting a rotation angle of said measuring lever, wherein said computer means calculates said plurality of new correction values from a resolution of said wheel rotation detecting means, said measuring lever rotation detecting means, and a length of said measuring lever.

* * * * *